United States Patent [19]

Hamman et al.

[11] Patent Number: 5,630,487
[45] Date of Patent: May 20, 1997

[54] METHOD OF INSTALLING ELECTRIC MOTORIZED BRAKE-LOCK SYSTEM

[75] Inventors: Seth W. Hamman, Kasota; Terry M. Bangert, Mankato, both of Minn.

[73] Assignee: Mico, Inc., No. Mankato, Minn.

[21] Appl. No.: 465,365

[22] Filed: Jun. 5, 1995

Related U.S. Application Data

[62] Division of Ser. No. 316,822, Oct. 3, 1994, Pat. No. 5,505,528, which is a continuation of Ser. No. 3,538, Jan. 13, 1993, abandoned.

[51] Int. Cl.$^6$ .................................................. B60T 17/16
[52] U.S. Cl. ........................................... 188/353; 180/273
[58] Field of Search ............... 303/10, 11, DIG. 1–4, 303/116.1, 116.2, 116.4, 9.61, 9.63, 89, 84.2, 9, 6.1; 188/353, 265; 180/273, 286

[56] References Cited

U.S. PATENT DOCUMENTS

| | | | |
|---|---|---|---|
| 696,752 | 4/1902 | Robertson . | |
| 772,654 | 10/1904 | Fraser . | |
| 1,807,956 | 6/1931 | Apple . | |
| 1,821,200 | 9/1931 | Apple . | |
| 1,876,543 | 9/1932 | Apple et al. . | |
| 1,880,129 | 9/1932 | Gattie | 180/273 |
| 1,978,663 | 10/1934 | Apple . | |
| 1,988,708 | 1/1935 | Apple . | |
| 2,044,944 | 6/1936 | House . | |
| 2,377,303 | 6/1945 | Acton . | |
| 3,280,933 | 10/1966 | Jones . | |
| 3,332,522 | 7/1967 | Dence . | |
| 3,360,305 | 12/1967 | Ryskamp . | |
| 3,487,451 | 12/1969 | Fontaine . | |
| 3,653,724 | 4/1972 | Smith . | |
| 3,716,116 | 2/1973 | Von Seggern . | |
| 3,788,431 | 1/1974 | York . | |
| 3,790,223 | 2/1974 | Fontaine | 180/273 |
| 3,842,950 | 10/1974 | Fontaine . | |
| 3,937,295 | 2/1976 | Wright | 180/103 |
| 3,951,464 | 4/1976 | Donahue et al. . | |
| 3,995,911 | 12/1976 | Kasselmann et al. . | |
| 4,116,296 | 9/1978 | Pleier et al. . | |
| 4,136,752 | 1/1979 | Friesen et al. | 180/273 |
| 4,151,509 | 4/1979 | Winiczei | 180/273 |
| 4,243,271 | 1/1981 | Dwyer . | |
| 4,258,819 | 3/1981 | Baptiste, Sr. | 180/287 |
| 4,336,860 | 6/1982 | Noller et al. . | |
| 4,343,517 | 8/1982 | Levington . | |
| 4,355,698 | 10/1982 | Barnes et al. . | |
| 4,392,544 | 7/1983 | Dilno . | |
| 4,402,553 | 9/1983 | Hipps . | |
| 4,546,845 | 10/1985 | Meyer et al. | 303/6.1 |
| 4,574,908 | 3/1986 | Brick . | |
| 4,608,825 | 9/1986 | Fontaine | 180/273 |
| 4,671,578 | 6/1987 | Rothen et al. . | |
| 4,812,777 | 3/1989 | Shirai | 303/10 |
| 4,824,178 | 4/1989 | Petersen | 303/15 |
| 4,838,617 | 6/1989 | Deitchman et al. | 303/6.1 |
| 4,842,340 | 6/1989 | Kullmann et al. . | |
| 4,899,642 | 2/1990 | Hwang . | |
| 4,927,213 | 5/1990 | Burgdorf | 303/10 |
| 4,934,492 | 6/1990 | Hayes-Sheen . | |
| 4,964,485 | 10/1990 | Miele . | |
| 5,002,345 | 3/1991 | Becker | 303/119 |
| 5,005,918 | 4/1991 | Schiel et al. | 303/114 |
| 5,037,161 | 8/1991 | Tackett | 303/115.4 |
| 5,346,289 | 9/1994 | Cords et al. . | |
| 5,368,372 | 11/1994 | Cords et al. . | |

FOREIGN PATENT DOCUMENTS

| | | | |
|---|---|---|---|
| 1519618 | 4/1968 | France . | |
| 25 48 856 A1 | 5/1977 | Germany . | |
| 58-004657 | 1/1983 | Japan | 303/115.4 |
| 0022672 | 1/1989 | Japan | 303/6.1 |

*Primary Examiner*—Matthew C. Graham
*Attorney, Agent, or Firm*—Merchant, Gould, Smith, Edell, Welter & Schmidt, P.A.,

[57] ABSTRACT

An automatic vehicle brake locking system, including an actuator (16) which segregates an auxiliary hydraulic fluid pump (42) from the normally used vehicle master cylinder (2). The actuator (16) is formed as a cylinder including a piston (36) which is biased to permit passage of hydraulic fluid which is pressurized by the vehicle master cylinder (2) through the actuator (16).

19 Claims, 5 Drawing Sheets

METHOD OF INSTALLING ELECTRIC MOTORIZED BRAKE-LOCK SYSTEM

This is a divisional of application Ser. No. 08/316,822, filed Oct. 3, 1994, now U.S. Pat. No. 5,505,528 which is a continuation of Ser. No. 08/003,538, filed Jan. 13, 1993 abandoned which applications are incorporated herein by reference.

FIELD OF THE INVENTION

The present invention relates to vehicular brake systems and more particularly to such systems operated by hydraulic fluid.

DESCRIPTION OF RELATED TECHNOLOGY

Most buses, trucks and other motor vehicle equipment used in mining and construction include a hydraulic brake system for applying brake power to each wheel of the vehicle when a pedal is pressed. In addition, an emergency parking brake system having a mechanical linkage to only two of the wheels or the drive shaft is also provided.

The conventional mechanical linkage system has several disadvantages. It must be manually set after the vehicle has been brought to a stop. As a result, it is often neglected and the driver or equipment operator relies on the transmission or the contour of the terrain to prevent the vehicle from moving after it has been parked. The transmission does not provide secure braking power and is generally only applied to two wheels. Also, movement by the equipment operator after a vehicle is parked could shift the transmission lever into the neutral position. Thus, even when the emergency brake has been set, it may be released inadvertently by the operator, or by a thief who has bypassed the ignition switch temporarily.

One solution is to control the emergency brake by use of the ignition key, such as suggested by Wright, U.S. Pat. No. 3,937,295. In Wright, the mechanical linkage, such as a cable, can be easily severed by a thief in order to release the brakes. Since emergency brakes are usually independent of the hydraulic brakes of a vehicle, malfunctioning emergency brakes do not affect normal operation of the vehicle.

Another attempt at a solution to securely braking a vehicle which is not in use is disclosed in U.S. Pat. No. 4,258,819, issued to Baptiste. Baptiste discloses a vehicle brake system that includes an auxiliary hydraulic pump for pumping hydraulic fluid to the usual hydraulic actuated brakes. The pump is activated in response to movement of the vehicle ignition switch into the "off" position. The hydraulic pressure is released when the ignition switch is moved to a position other than the "off" position.

During the pressurization mode described by Baptiste, the auxiliary pump is deactivated in response to a predetermined high pressure level. During the pressure release mode described by Baptiste, the pump draws pressure from the brakes and is deactivated at a pre-determined low pressure level. Check valves are provided by Baptiste to control the fluid flow to and from the auxiliary pump during the pressurization and pressure release modes.

A problem with the Baptiste device is that the electric valves that control fluid in the brake system as well as the pump circuit are integrated with the normal service brake circuit. Thus, the Baptiste device may still encounter a failure of the emergency brake system due to failure of the electric valves, fittings, pump release valves or other associated downstream components in the braking system.

SUMMARY OF THE INVENTION

The brake locking system of the present invention may be used not only as a brake lock, but also as a bus door interlock or as part of a "dead man" system. For example, when a bus door is open, the brakes will be automatically engaged. In a "dead man" system, the brakes will be activated if an operator is dislodged from the operator seat which would be normally occupied during operation of the particular piece of equipment. Additionally, the brake lock system may be engaged in an override mode when a switch is toggled to an override position.

The automatic vehicle brake system of the present invention includes an auxiliary hydraulic pump for pumping hydraulic fluid to the hydraulically actuated brakes. The hydraulically actuated service brake circuits are segregated from the auxiliary pump circuit by means of at least one actuator, and preferably at least two actuators, one each for the front wheels and the rear wheels, respectively.

BRIEF DESCRIPTION OF THE DRAWING

The foregoing features and advantages of the invention will be apparent from the following more particular detailed description of preferred embodiments of the invention, as illustrated in the accompanying drawing. The drawing is of a schematic nature, with emphasis being placed on illustrating the principles of the invention.

THE DESCRIPTION OF PREFERRED EMBODIMENTS

Figure 2:
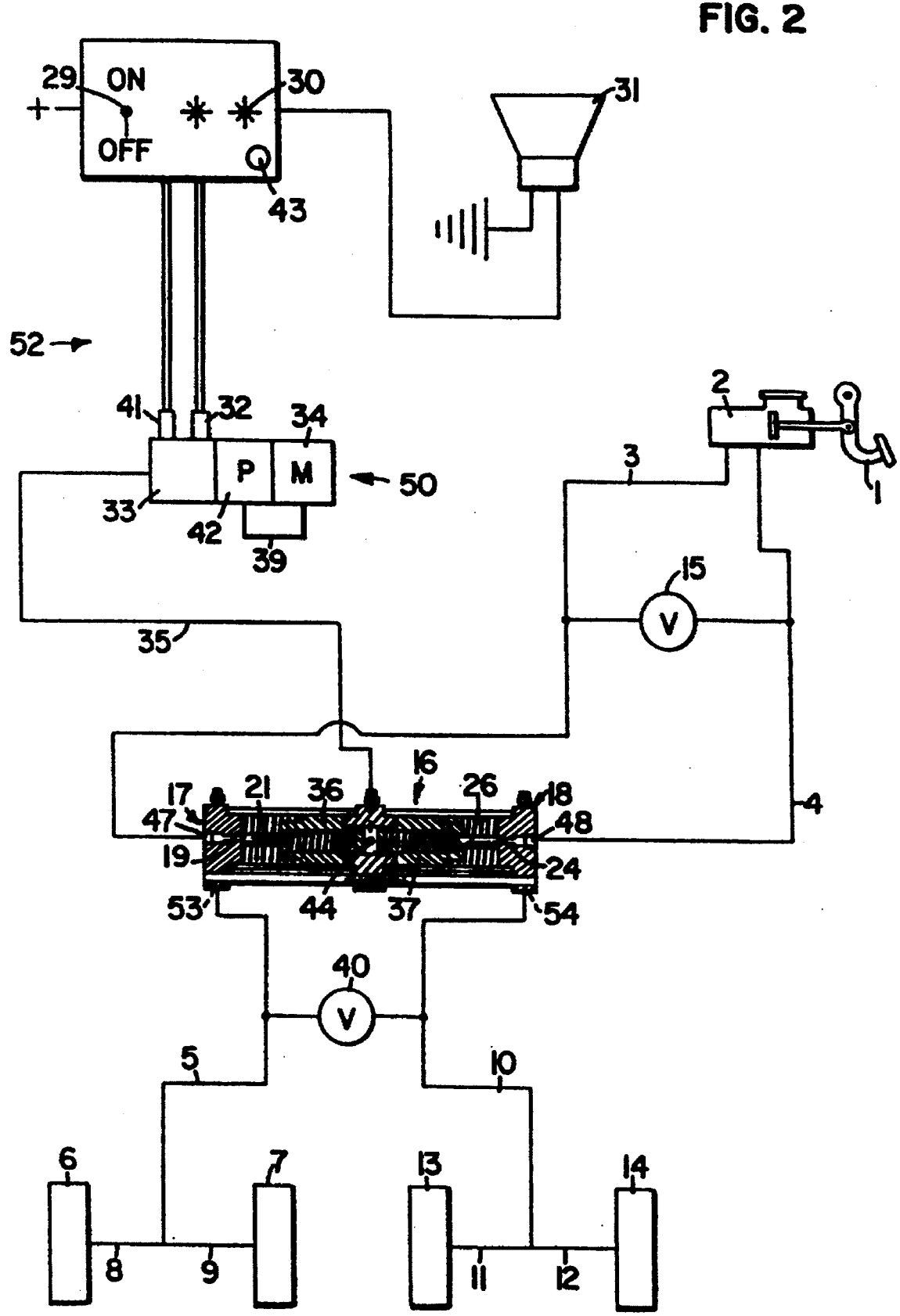
FIG. 2 is an electrical and hydraulic schematic diagram of a preferred embodiment of an auxiliary brake system embodying the present invention.

As shown in FIG. 2, in a conventional hydraulic brake system a foot pedal 1 operates a master cylinder 2. Movement of the brake pedal 1 increases pressure in the fluid lines 3 and 4. In a conventional system, the pressure in fluid line 3 would be transmitted through line 5 to front fluid lines 8 and 9 in order to actuate the brake cylinders 6 and 7 associated with the front wheels (not shown). Similarly, pressure would be transmitted without interruption along fluid line 4 through fluid line 10 and into rear fluid lines 11 and 12 in order to actuate brake cylinders 13 and 14 at the rear wheels (not shown).

In a properly operating brake system, the pressure in lines 3 and 4 should be approximately equal throughout the operating cycle of the brake system. If, for some reason, a breach in the integrity of the hydraulic system has occurred, causing different pressures to exist in lines 3 and 4, a warning valve 15, sensing the pressure difference between lines 3 and 4, will indicate the presence of a potential brake system failure by means of a suitable indication (not shown).

Figure 1:
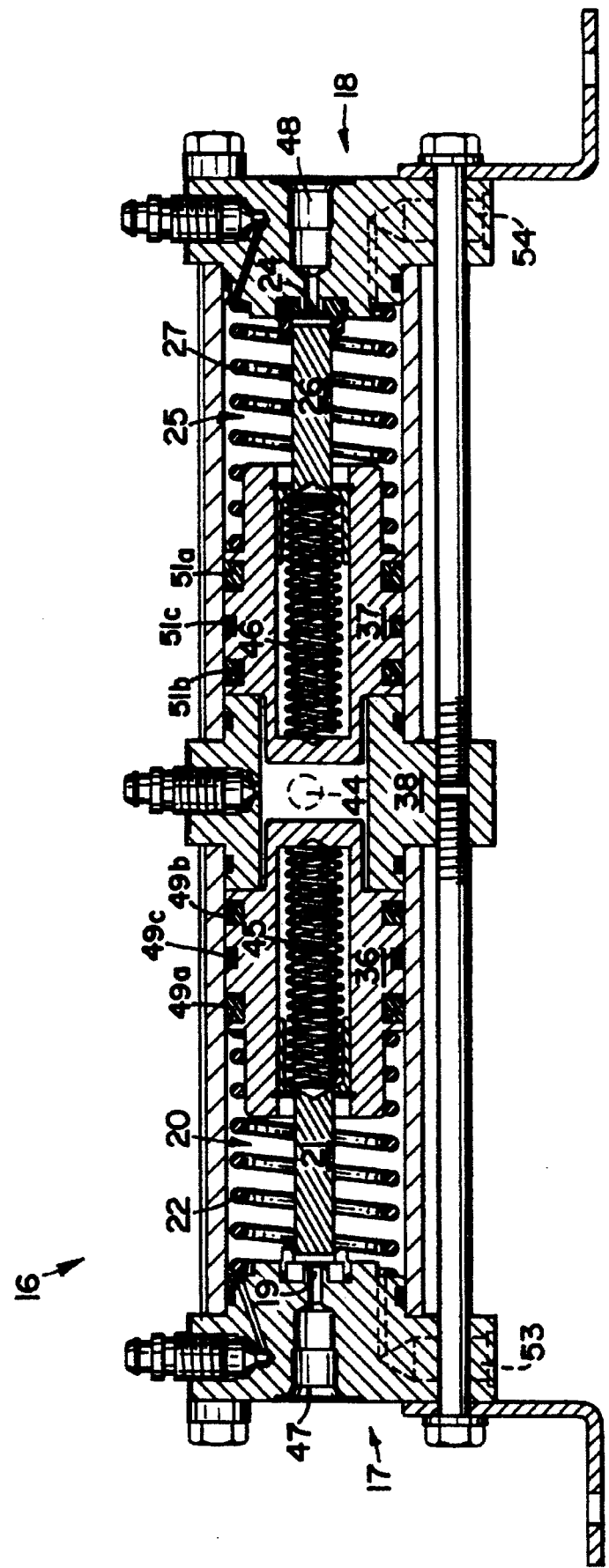
FIG. 1 is a schematic diagram of a preferred embodiment of a dual actuator embodying the present invention.

In accordance with the present invention, a dual actuator 16 is interposed between brake lines 3 and 5 as well as between brake lines 4 and 10, as shown in FIGS. 1 and 2. Line 3 is connected at inlet port 47, line 4 is connected at inlet port 48, line 5 is connected at outlet port 53, and line 10 is connected at outlet port 54. In a preferred embodiment the actuator 16 includes a front axle actuator 17 and a rear axle actuator 18. The two actuator halves 17 and 18 are substantially identical in their operation. For purposes of explanation, front axle actuator 17 will now be discussed.

As shown in FIG. 1, the actuator 17 includes an inlet seat 19 which permits pressure transmitted from master cylinder 2 along brake line 3 to enter the actuator 17. Actuator 17 is formed as a cylinder 20 within which resides a piston 36 connected to a spring loaded stem 21 through spring 45, which tends to urge stem 21 towards seal 19. Also connected to piston 36 is return spring 22 which returns piston 36 against cylinder separator 38. Hydraulic fluid is present in cylinder 20 on both sides of piston 36. With no pressure applied to piston 36, fluid is free to flow from line 3 to line 5, as piston 36 and spring loaded stem 21 are normally oriented away from seat 19 due to return spring 22. The opposing chambers defined in cylinder 20 by piston 36 are sealed from one another by a primary seal having u-cup seals 49a and 49b disposed between piston 36 and the walls of cylinder 20. In addition, a secondary seal as o-ring 49c circumscribes piston 36 between u-cups 49a and 49b.

Rear axle actuator 18 operates in a substantially identical manner, with inlet seat 24 being connected to fluid line 4. Rear axle actuator 18 includes cylinder 25 within which resides piston 37 and spring loaded stem 26 connected through spring 46. Piston 37 also includes a primary seal including u-cups 51a and 51b, as well as an o-ring secondary seal 51c. Also, return spring 27 is connected to piston 37 to return piston 37 against cylinder separator 38. Hydraulic fluid is present in cylinder 25 on both sides of piston 37. With no pressure applied to piston 37, fluid is free to flow from line 4 to line 10, as piston 37 and spring loaded stem 26 are normally oriented away from seat 24 due to return spring 27.

Therefore, in normal operation, by depressing brake pedal 1 pressure is created in master cylinder 2 which passes along fluid lines 3 and 4, through actuator 16 without significant head loss, and into fluid lines 5 and 10 so as to actuate brake cylinders 6, 7, 13 and 14 in a normal manner. In this mode, actuator 16 simply acts as a container for fluid.

As shown in FIG. 2, line 35 is connected to actuator 16 at inlet port 44 and to auxiliary hydraulic fluid pump 50, which is controlled generally by auxiliary brake control 52.

When the vehicle or equipment including the braking system is in a situation where the brakes should be locked, such as in short term parking, the locking system of the present invention is activated. An "on"-"off" switch 29 must be placed into the "on" position in order to lock the brakes. While the "on" switch is shown as a toggle switch in FIG. 2, those skilled in the art would appreciate that the "on" switch may be a part of a bus door interlock switch, a part of a "dead man" system including a seat sensor, or any other suitable switch, such as a motion detector, which would be activated when it is desirable to indicate a situation or perhaps an emergency in which the vehicle brakes should be locked.

For purposes of discussion, it will be assumed that the locking system must be manually activated by throwing switch 29, which would occur if the vehicle were to be intentionally left unattended for some period of time. In that case, an indicator light 30 would be activated to indicate that the brakes are locked. Additionally, a warning horn 31 and a cab alarm 43 are activated when the switch is turned on, indicating that the brakes are to be locked but that system pressure has not yet reached a level which would afford a complete brake locking force. Thus, the cab alarm would be on for a short period of time during which the operator should not leave the vehicle.

In a preferred embodiment, the brake system pressure should be approximately 800 psi. In that case, the horn 31 and cab alarm 43 would be adjusted so that they would shut-off when a pressure of 800 psi has been reached. This may be accomplished by connecting horn 31 and cab alarm 43 to a circuit including a normally-closed switch 32 which is connected to pump manifold 33. Switch 32 should be selected so that it will open at a pressure of 600 psi, and close at a pressure of 800 psi, ultimately breaking the connection between the horn and cab alarm, and their source of electrical power, when brake system operating pressure has been reached.

By activating switch 29, reversible motor pump 34 is activated, thereby building the pressure in manifold 33 and causing the pressure to increase in actuator fluid line 35. Fluid from line 35 enters actuator 16 through inlet port 44 and acts against pistons 36 and 37, which tend to counteract the effect of return springs 22 and 27, respectively.

In operation, therefore, pressure applied through line 35 from manifold 33 causes stems 21 and 26 to seal seats 19 and 24, respectively, of the actuator 16, thereby isolating the vehicle master cylinder 2 and its associated hydraulic plumbing from the wheel brake cylinders 6, 7, 13 and 14. Instead, hydraulic fluid from manifold 33 passes through line 35, and into actuator 16 through inlet port 44. This pressurizes pistons 36 and 37, which, in turn, pressurizes the fluid in the actuator, diverting it to lines 5 and 10 and activating brake cylinders 6, 7, 13 and 14. As the pressure increases, pistons 36 and 37 are allowed to travel beyond the point at which stems 21 and 26 seal seats 19 and 24, respectively, as springs 45 and 46 allow stems 21 and 26 to recede into pistons 36 and 37, respectively, without losing their seal. In this way, the wheels are locked independently of any manipulation of the vehicle master cylinder and despite any possible breach of integrity in the service brake hydraulic plumbing upstream of actuator 16.

If there should be a loss of fluid at either front line 5 or rear line 10, the horn 31 and cab alarm 43 will sound and pump 34 will energize when system pressure deteriorates to 600 psi. If fluid thermal expansion occurs, the excess fluid will be returned to the pump manifold 33 via the internal pump thermal relief valve 39 which is preferably set at approximately 1100 psi. Also, if the fluid in lines 35, 5 or 10 should cool to a point where the pressure in the system is below 600 psi, the horn 31 and cab alarm 43 will momentarily sound and pump 34 will again activate.

If one brake system portion (lines 5, 8 or 9 for example) should fail because of an inoperable wheel cylinder (6 or 7) disk brake, fitting, etc., the actuator piston (piston 36 in this case) will "bottom out", that is, travel the full length of cylinder 20. Seal 19 will still be closed by stem 21. This will cause the horn 31 and cab alarm 43 to sound and the pump 34 will attempt to compensate for the loss of fluid. In that case, the pump system will pump again to a pressure of 800 psi. The location of warning valve 40 downstream of the actuator 16 will cause the vehicle brake system warning light (not shown) to activate once the vehicle is started. If warning valve 40 were to be installed upstream of lock 16 (not shown) the warning light would not indicate a potential problem until the vehicle operator operated the service brakes. In order to solve that potential problem, two normally open switches (not shown) could be installed at the front and rear lines 3 and 4 as they enter the actuator. These could be wired to indicate a brake system failure.

In order to release the brake locking system, the switch 29 is moved to the "off" position. By turning switch 29 to "off", the polarity of the connections to pump motor 34 is reversed (usually by a pair of relays-not shown). A normally open switch 41, which is calibrated to open at 7 psi and close at 14 psi, is closed because there is a line 35 hydraulic pressure of 800 psi. Therefore, motor pump 34 switches on to begin to pump fluid out of actuator 16.

The return springs 22 and 27 in the actuator have a preload of preferably 30 lbs. Assuming that the actuator pistons 36 and 37 have a diameter of 1¾ inches, at approximately 12.5 psi the actuator pistons withdraw to an open position (i.e. opening orifices 19 and 24) and the normally open switch returns to the "open" mode which would deactivate all motor pump 34 circuits. At this point, the "system on" light 30 would go off and normal service brake operation would be possible. Further, with orifices 19 and 24 open, system pressure then reaches equilibrium of about 0 psi throughout the main brake system.

Figure 3:
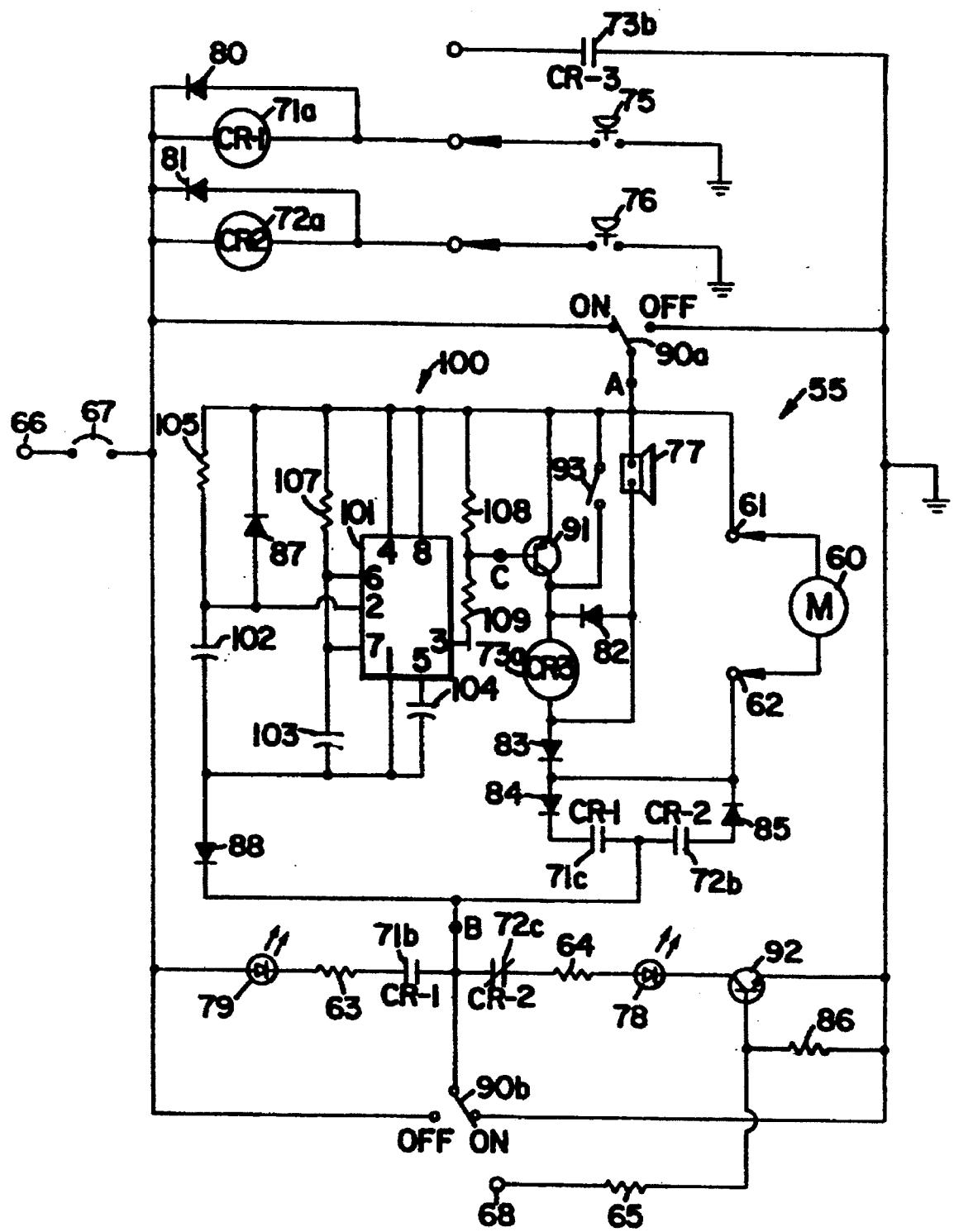
FIG. 3 is an electrical schematic diagram of another preferred embodiment of an electrical control system with a time delay startup.

An alternative embodiment to auxiliary brake control 52 is shown generally in FIG. 3. This embodiment provides a more sophisticated and complex control system than that which is shown in FIG. 2. This embodiment employs a more sophisticated warning system by providing a delay circuit for preventing the sounding of the vehicle horn upon initial activation of the system.

The auxiliary brake control shown in FIG. 3 is shown connected to a reversible motor 60 which provides mechanical power for a pump assembly similar to pump 50 shown in FIG. 2. The pump (not shown) has a pump mechanism, a internal pump thermal relief valve, and a manifold similar to that of pump 50. The pump would be, in turn, connected to line 35 of the hydraulic system shown in FIG. 2. That is, actuator 16 is connected in the same manner to the vehicle's main braking system.

The brake control system controls the operation of motor 60, and consequently the pressure in line 35, by a series of relays (shown as 71a–c and 72a–c) and normally open pressure sensitive switches (shown as 75 and 76). The normally open pressure sensitive switches 75 and 76 are connected to the pump manifold, and are sensitive to the pressure existent in line 35. Coil 71a of relay 71 is connected between the power source and switch 75, in parallel with reverse biased 1N4004 diode 80. In turn, switch 75 is connected to ground. Switch 75 is configured to close at 800 psi, and open again at 600 psi. Therefore, switch 75 will energize coil 71a whenever the pressure rises above 800 psi and until the pressure drops below 600 psi.

Similarly, coil 72a of relay 72 is connected between the power source and switch 76 in parallel with reverse biased 1N4004 diode 81, and switch 76 is in turn connected to ground. Switch 76 is configured to close at 14 psi and to open at 7 psi, so that coil 72a will be energized whenever the pressure rises above 14 psi and until the pressure drops below 7 psi.

The main control for the auxiliary brake control system is provided through double-pole double-throw toggle switch 90, shown schematically as switch 90a and 90b. This switch is located inside the passenger compartment of the vehicle, on a control panel which also includes cab alert 77, system on LED 79, and system off LED 78. When the toggle switch is in its "off" position, point A of the circuit is connected to ground, and point B of the circuit is connected to 12 V power source 66 through 15 amp circuit breaker 67. When the toggle switch is switched to an "on" position, point A on the circuit is connected to the power source and point B is connected to ground.

Power to the motor and warning systems for the auxiliary brake system is provided through pump activation circuit 55, which is found between points A and B on FIG. 3. Motor 60 is connected to the circuit through leads 61 and 62. Motor 60 is configured such that when a positive voltage drop exists across lead 61 to 62, the motor will operate to pump hydraulic fluid into line 35 and increase the pressure of the system. In addition, a negative voltage drop across lead 61 to 62 results in motor 60 pumping hydraulic fluid out of line 35, and decreasing the pressure in the system. Lead 61 in motor 60 is connected directly to point A. Lead 62 is connected to point B through forward biased 1N3493R diode 84 and the normally closed contact 71c of relay 71. In addition, lead 62 is connected to point B through reverse biased 1N3493R diode 85 and normally open contact 72b of relay 72.

Cab alert 77 is also provided in pump activation circuit to provide an audible alarm whenever motor 60 is providing pressure to the system (i.e., when a positive voltage drop exists across lead 61 to 62). Cab alert 77 is connected between point A and lead 62 through forward biased 1N4004 diode 83.

In addition to cab alert 77, the auxiliary brake control includes an additional warning circuit which activates the vehicle's horn in certain low pressure conditions. The vehicle's horn (not shown) is connected to ground through normally open contact 73b of relay 73. The vehicle's horn is activated whenever contact 73b is closed, which occurs when coil 73a is energized. Coil 73a of relay 73 is connected between point A and the positive lead of diode 83 through MPSA55 PNP transistor 91. Furthermore, coil 73a is connected in parallel with reverse biased 1N4004 diode 82.

PNP transistor 91 is configured to conduct, and consequently activate coil 73a to sound the vehicle's horn, when a voltage drop exists across its emitter-base junction. The voltage drop is provided by delay circuit 100, which operates to delay the activation of the vehicle's horn warning so that the horn will only sound when a pressure loss occurs, and not during normal power up.

Delay circuit 100 consists primarily of timer IC 101, configured in monostable operation. Timer 101 is preferably an LM555 timer, which is commonly known in the art. One skilled in the art will appreciate, however, that any number of alternate IC's or circuitry may be used to produce the required delay.

Timer 101 is configured with its positive voltage (pin 8) connected to point A, and its ground (pin 1) connected through forward biased 1N4004 diode 88 to point B, such that when toggle switch 90 is in "on" position, power will be supplied to the timer circuit. When toggle switch 90 is in an "off" position, diode 88 prevents the voltage at point B from reaching the timing circuit.

The reset (pin 4) is connected directly to point A, and control voltage (pin 5) is connected to ground through 0.01 μF 50 V capacitor 104. The trigger (pin 2) is connected to point A through a parallel combination of 10 KΩ ¼ W resistor 105 and 1N4004 diode 87, which is reverse biased with respect to point A. The trigger is also connected to ground through 22 μF 25 V capacitor 102. The threshold (pin 6) and discharge (pin 7) inputs of timer 101 are connected to point A through 200 KΩ ¼ W resistor 107. The threshold and discharge are also connected to ground through 47 μF 25 V capacitor 103. Finally, the output (pin 3) is connected to point A through 4.7 KΩ ¼ W resistor 108 and 1 KΩ ¼ W resistor 109, with the base (point C) of transistor 91 connected between resistors 108 and 109.

Timer delay circuit 100 is configured such that upon power-up transistor 91 will not energize coil 73a when motor 60 is initially pressurizing the system. Upon switching toggle switch 90 to its "on" position, power will be supplied to timer 101, and a low trigger signal will be provided at pin 2 due to the action of the RC circuit comprised of resistor 105 and capacitor 102. This will initially drive output (pin 3) to a high condition. So configured, no voltage drop will exist from the emitter to the base on PNP transistor 91, and therefore no current will conduct to energize coil 73a. Timer 101 will remain in this configuration until the voltage across capacitor 103 reaches a level which will trigger the internal flip-flop in timer 101 to drive the output (pin 3) to a low state. The time required is approximately equal to 1.1 times the product of the resistance seen through resistor 107 and the capacitance of capacitor 103. There should be sufficient time for motor 60 to pressurize the system to operating pressure before the delay circuit drives the base voltage low and energizes transistor 91. With a 200 KΩ resistor and 4.7 μF capacitor, this delay will be in the range of 10 seconds, which is well within the time required to pressurize the system.

When the output (pin 3) is driven low after the desired time delay, transistor 91 will be enabled to energize coil 73a whenever motor 60 is activated. This is because the low state at pin 3 will decrease the voltage at the base of transistor 91, and provide the necessary voltage drop from emitter to base.

An override switch 93 is also provided between point A and coil 73a of relay 73. This switch, when closed, overrides the delay circuit to test the vehicle horn integrity during power up.

System on LED 79 is connected between the power source and point B in series with 820Ω ½ W resistor 63 and normally open contact 71b of relay 71. Preferably this LED is green in color, and is configured to light whenever coil 71a of relay 71 is energized. System on LED 79 will be lit whenever the auxiliary braking system is active and pressurized to operating pressure (i.e., when switch 75 is closed).

System off LED 78 is connected between point B and ground in series with 820Ω ½ W resistor 64, normally closed contact 72c of relay 72 and 2N3904 NPN transistor 92. Transistor 92 is configured as a switch, with its collector connected to system off LED 78 and its emitter connected to ground. The base of transistor 92 is connected to the ignition switch lead 68 through 10 KΩ ¼ W resistor 65, and is connected to the collector through 22 KΩ ¼ W resistor 86. System off LED 78 is preferably amber in color, and will light whenever transistor 92 is configured to conduct, and when normally closed contact 72c is closed. This condition will occur when the ignition switch of the vehicle is on and when coil 72a of relay 72 is not energized (i.e., when switch 76 is open).

The operation of the auxiliary brake control shown in FIG. 3 is as follows. In an initial state, where toggle switch 90 is in an "off" position, and where no pressure exists in the pump manifold, switches 75 and 76 are open and coils 71a and 72a are not energized. In addition, if the ignition is off, system off LED 78 is off. However, if the ignition is on, transistor 92 is configured to conduct, normally closed contact 72c is closed, and system off LED 78 is lit, to indicate that the auxiliary braking system is not pressurized.

The system is activated by switching toggle switch 90 to the "on" position. When the switch is in an "on" position, point A is connected to the power source, and point B is connected to ground. As there is no pressure in the system, normally closed contact 71c is closed. Therefore, a current will be established from point A, through lead 61, lead 62, diode 84, and contact 71c, which activates motor 60 to increase the pressure in the pump manifold. In addition, cab alert 77 will sound, as a connection exists between point A and point B through diodes 83 and 84 and contact 71c.

However, during initial start-up, the vehicle's horn will not sound due to the operation of delay circuit 100, which does not provide the voltage drop across the emitter-base junction of transistor 91 for approximately 10 seconds. Should the motor remain on for a sufficient period of time to allow delay circuit 100 to provide the voltage drop across the emitter-base junction, transistor 91 will conduct, and coil 73a of relay 73 will be energized to sound the vehicle's horn. This will indicate a probable leakage condition due to the abnormally long period in which the motor is running.

Motor 60 will continue to run until the pressure in line 35 reaches 800 psi. At this point, switch 75 will close, and relay coil 71a will be energized. This will open normally closed contact 71c to break the connection between points A and B, shutting off motor 60 and cab alert 77. Furthermore, normally open contact 71b will close and light system on LED 79, to indicate to a vehicle operator that the auxiliary brake system is pressurized to operating conditions.

Should the pressure in line 35 ever drop below 600 psi, switch 75 will once again open, and de-energize coil 71a. This will turn off the system on LED 79, and turn on motor 60. Furthermore, the cab alert and vehicle horn will also sound to indicate a loss of pressure. Once the pressure in line 35 has been returned to 800 psi, switch 75 will close, shutting down motor 60 and the lighting system on LED 79.

The horn will sound in this repressurization situation because delay circuit 100 has not been reset, as the active-low reset (pin 4) and trigger (pin 2) of timer 101 are held in their high states. Delay circuit 100 can only be reset by switching toggle switch 90 to "off", removing power to the circuit.

In order to shut off the auxiliary brake system, toggle switch 90 must be switched to "off" position. This will connect point A to ground and point B to the power source. With the pressure in line 35 initially at 800 psi, switch 76 is closed, and coil 72a is energized. A connection will thus be created between points B and A through normally open switch 72b, diode 85, and across lead 62 to 61. Motor 60 will be put in reverse mode, pumping hydraulic fluid out of line 35 and removing pressure from the system. The cab alert and vehicle horn will not sound, however, because of diode 83

Motor 60 will continue to pump hydraulic fluid out of line 35 until the pressure reaches around 7 psi, at which switch 76 will open. This will de-energize coil 72a, and break the connection between points B and A. Motor 60 will then be shut off. Furthermore, system off LED 78 will again light if the ignition is turned on, through the connection created by normally closed contact 72c. At this point, the pressure in line 35 will return to an equilibrium pressure of around 0 psi, as seats 19 and 24 in actuator 16 will open to return the vehicle to operating condition.

Figure 4:
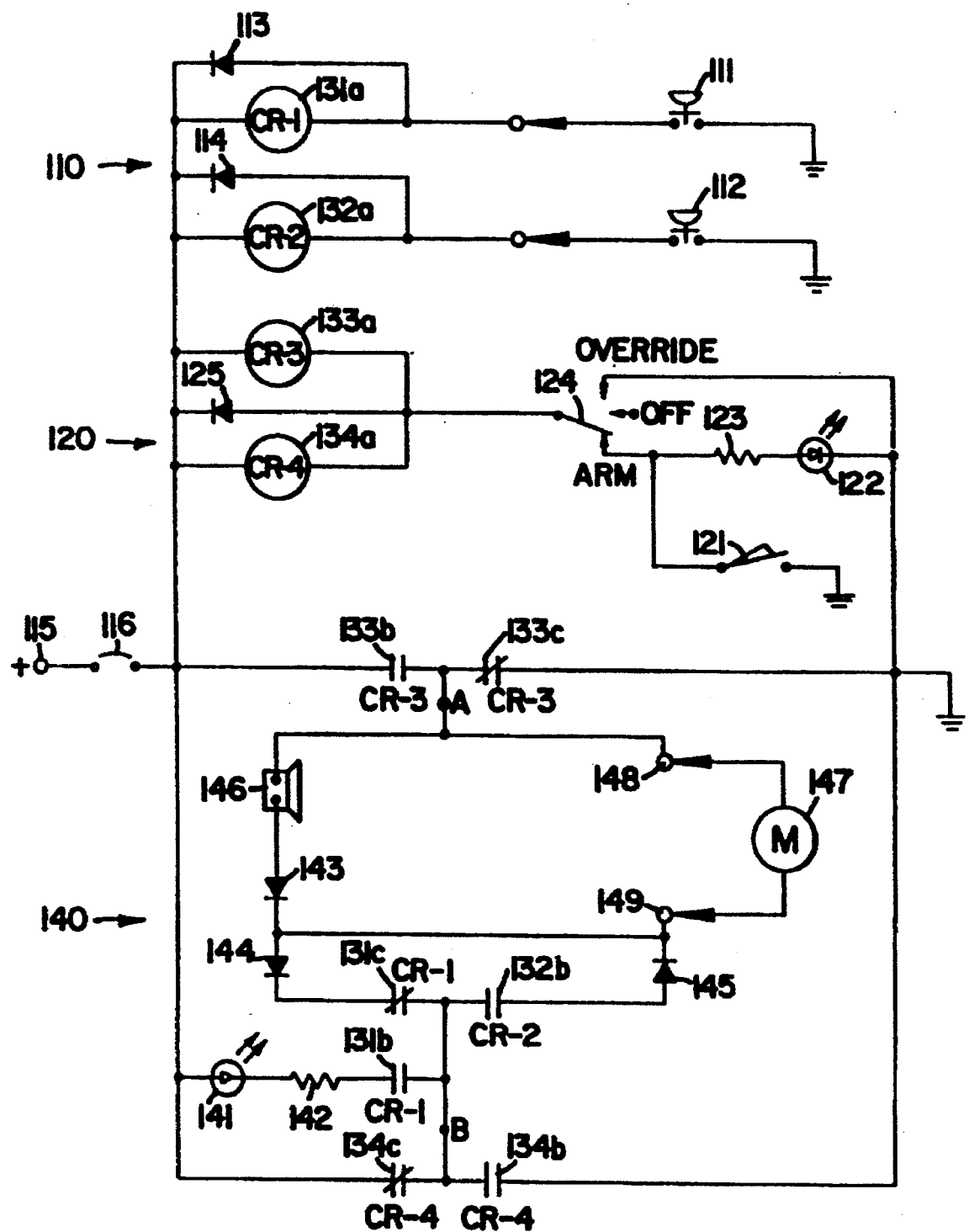
FIG. 4 is an electrical schematic diagram of another preferred embodiment of an electrical control system with a bus door interlock activation mechanism.

Another alternative embodiment to the auxiliary brake control 52 is shown in FIG. 4. This embodiment provides a bus door interlock system for buses or other vehicles, which will, when enabled, pressurize the vehicle's brakes whenever the bus doors are opened. This embodiment also includes an "override" mode whereby this auxiliary brake system may be used as a temporary brake similar to the other embodiments discussed above.

The auxiliary brake control system in FIG. 4 primarily contains three circuits: pressure control circuit 110, user control circuit 120, and pump activation circuit 140. The auxiliary brake control is shown connected to reversible motor 147 which provides mechanical power for a pump assembly similar to pump 50 shown in FIG. 2. The pump (not shown) has a pump mechanism, an internal pump thermal relief valve, and a manifold similar to that of pump 50. The pump would be, in turn, connected to line 35 of the hydraulic system shown in FIG. 2, with the exception that the actuator used would be a single, rather than a double actuator system. The single actuator would incorporate, for instance, the hardware shown in FIG. 5. This is because it is preferable to only lock the rear brakes of the bus in this embodiment.

Figure 5:
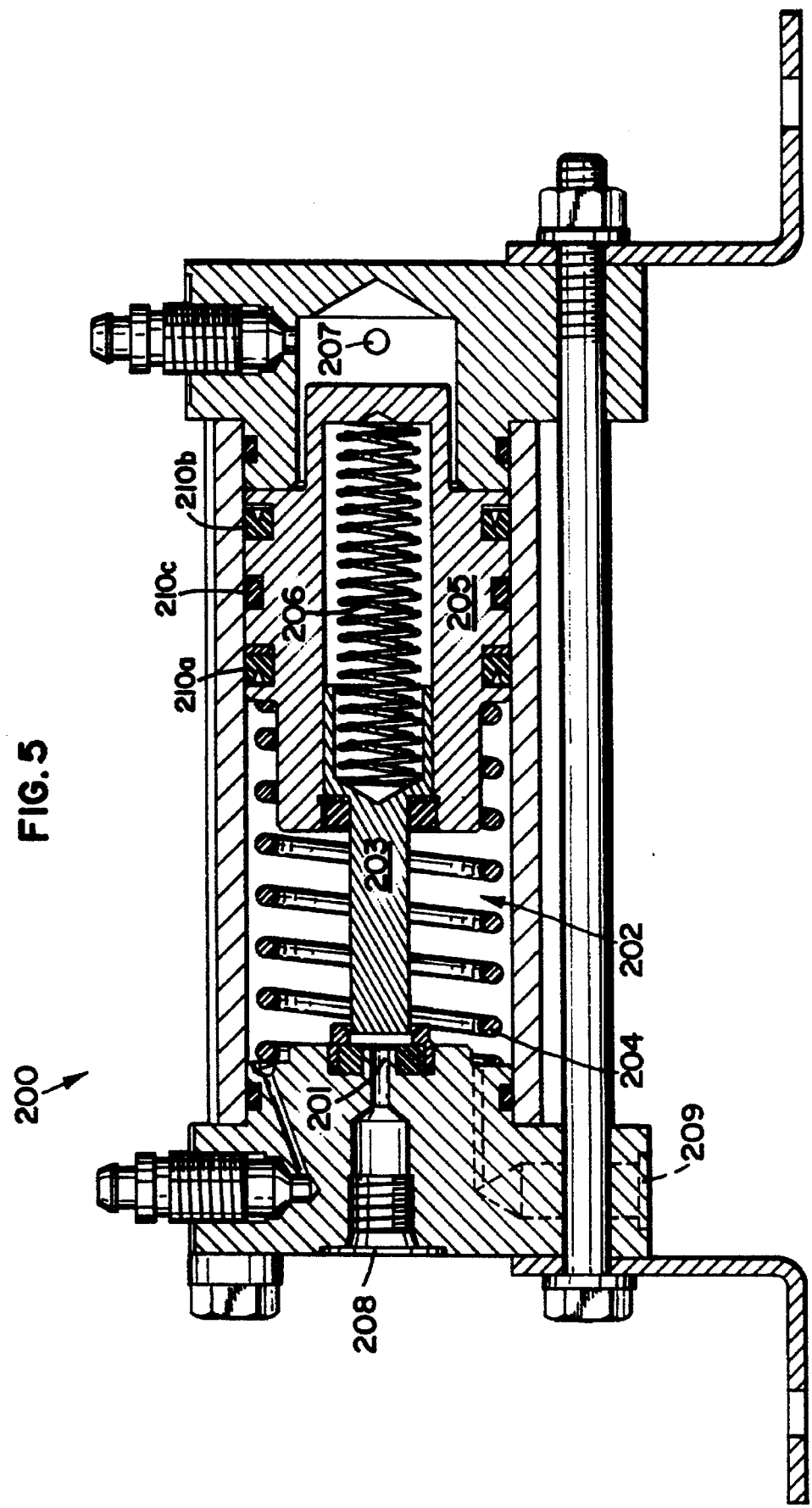
FIG. 5 is a schematic diagram of an alternative embodiment of a single actuator for use with a front-axle or rear-axle brake actuation system.

As shown in FIG. 5, a single actuator 200 is similar in structure and function to front or real actuator 17 or 18 of dual actuator 16 in FIG. 1. For, instance, seat 201 corresponds to seat 19, cylinder 202 corresponds to cylinder 20, stem 203 corresponds to stem 21, spring 204 corresponds to spring 22, piston 205 corresponds to piston 36, primary seal u-cups 210a and 210b correspond to u-cups 49a and 49b, secondary o-ring seal 210c corresponds to o-ring 49c, spring 206 corresponds to spring 45, inlet port 207 corresponds to inlet port 44, inlet port 208 corresponds to inlet port 47, and outlet port 209 corresponds to outlet port 53.

One skilled in the art will appreciate that an all-wheel braking system, with actuator 16 controlling both the front and rear brakes, could alternatively be used. In fact, one skilled in the art will appreciate that the electrical circuits shown in FIGS. 3 and 4, and described for FIG. 2, would work identically regardless of whether a single or double actuator is used.

The pressure control circuit 110 controls the operation of motor 147, and consequently the pressure in line 35, by a series of relays (shown as 131a–c, 132a–b) and normally open pressure sensitive switches (shown as 111 and 112). The normally open pressure sensitive switches 111 and 112 are connected to the pump manifold, and are sensitive to the pressure existing in line 35. Coil 131a of relay 131 is connected between the 12 V power source 115 and switch 111, in parallel with reverse biased 1N4004 diode 113. In turn, switch 111 is connected to ground. Switch 111 is configured to close at 800 psi, and open again at 600 psi. Therefore, switch 111 will energize coil 131a whenever the pressure rises above 800 psi and until the pressure drops below 600 psi.

Similarly, coil 132a of relay 132 is connected between the power source and switch 112 in parallel with reverse biased 1N4004 diode 114, and switch 112 is, in turn, connected to ground. Switch 112 is configured to close at 14 psi and to open at 7 psi, so that coil 132a will be energized whenever the pressure rises above 14 psi and until the pressure drops below 7 psi.

Main control for the auxiliary brake control system is provided through user control circuit 120. This circuit includes a pair of relays connected in series with a single-pole, triple-throw toggle switch 124. This switch is located inside the passenger compartment of the vehicle, on a control panel which also includes cab alert 146, system armed LED 122, and system "on" LED 141.

Toggle switch 124 is connected to the power source 115 through the parallel configuration of relay coil 133a, relay coil 134a, and reverse biased 1N4004 diode 125. Toggle switch 124 has three operating positions, which will selectively energize relays 133a and 134a by connecting them to ground. In its "off" position, toggle switch 124 isolates relay coils 133a and 134a, and prevents them from energizing. In its "override" position, toggle switch 124 connects the relay coils directly to ground, energizing coils 133a and 134a. Finally, in its "arm" position, toggle switch 124 enables relays 133a and 134a to be energized whenever bus door switch 121 closes, which will occur whenever the vehicle operator opens the door. Also, whenever toggle switch 124 is in "arm" position and bus door switch 121 is open, system armed LED 122, connected through 1 KΩ ½ W resistor 123, will light to indicate that the system is armed but not pressurized. This LED is preferably amber in color.

Power to the motor and warning system for the auxiliary brake system is provided through pump activation circuit 140, which is found between points A and B on FIG. 4. Motor 147 is connected to the circuit through leads 148 and 149. Motor 147 is configured such that when a positive voltage drop exists across lead 148 to 149, the motor will operate to pump hydraulic fluid into line 35 and increase the pressure of the system. In addition, a negative voltage drop across lead 148 to 149 results in motor 147 pumping hydraulic fluid out of line 35 and decreasing the pressure in the system. Lead 148 of motor 147 is connected directly to point A. Lead 149 of motor 147 is connected to point B through forward biased 1N3493R diode 144 and the normally closed contact 131c of relay 131. In addition, lead 149 is also connected to point B through reverse biased 1N3493R diode 145 and normally open contact 132b of relay 132.

Cab alert 146 is also provided in pump activation circuit 140 to provide an audible alarm whenever motor 147 is providing pressure to the system (i.e., when a positive voltage drop exists across lead 148 to 149). Cab alert 146 is connected between point A and lead 149 through forward biased 1N4004 diode 144.

System on LED 141 is connected between the power source and point B in series with 1 KΩ ½ W resistor 142 and normally open contact 131b of relay 131. Preferably this LED is green in color, and is configured to light whenever coil 131a of relay 131 is energized. System on LED 141 will be lit whenever the auxiliary braking system is active and pressurized to operating pressure (i.e., when switch 111 is closed).

Points A and B of pump activation circuit 140 are selectively connected between the power source and ground by the contacts of relays 133 and 134. Point A is connected to the power source through normally open contact 133b, and is connected to ground through normally closed contact 133c. Likewise, point B is connected to the power source through normally closed contact 134c of relay 134, and is connected to ground through normally open contact 134b.

The operation of the auxiliary brake control shown in FIG. 4 is as follows. In an initial state, where toggle switch 124 is in an "off" position, and where no pressure exists in the pump manifold, switches 111 and 112 are open and coils 131a and 132a are not energized.

The system is placed in bus door interlock mode by switching toggle switch 124 to the "arm" position. With the bus door closed, and bus door switch 121 open, amber-colored system armed LED 122 will light. This will indicate to the vehicle operator that the system will be pressurized whenever the bus doors open. When the vehicle operator opens the bus door, bus door switch 121 closes, which turns off system armed light 122, and energizes relay coils 133a and 134a. This will, in turn, connect point A to the power source 115 through 15 amp circuit breaker 116 and the now-closed normally open contact 133b. Point B will be connected to ground through the now-closed normally open contact 134b. As there is no pressure in the hydraulic system, coil 131a is not energized, and normally closed contact 131c is closed. Therefore, a current will be established from the power source, through contact 133b, lead 148, lead 149, diode 144, contact 131c, and contact 134b, which activates motor 147 to increase the pressure in the pump manifold. In addition, cab alert 146 will sound, as a connection exists between point A and point B through diodes 143 and 144 and contact 131c.

Motor 147 will continue to increase the pressure in the system until the system pressure reaches 800 psi, at which switch 111 will close and energize coil 131a. This will open normally closed contact 131c, and break the connection between points A and B. Therefore, motor 147 and cab alert 146 will turn off. In addition, system on LED 141 will turn on, to indicate that the system is activated, and that the brakes are pressurized.

Should the pressure in line 35 ever fall below 600 psi, indicating a possible leak condition, switch 111 will open again, de-energizing coil 131a, and restarting motor 147 and cab alert 146 until pressure has been re-established and switch 111 once again closes.

Once the vehicle operator closes the bus door, bus door switch 121 will open, once again lighting system armed LED 122 and de-energizing coils 133a and 134a. This will now connect point A to ground through normally closed contact 133c, and connect point B to power through normally closed contact 134c. As the pressure in line 35 is approximately 800 psi, switch 112 will be closed, and relay coil 132a will be energized. With relay coil 132a energized, normally open contact 132b is closed, and a connection will exist between the power source and ground through contact 134c, contact 132b, diode 145, lead 149, lead 148, and contact 133c. In this configuration, motor 147 is energized to begin pumping hydraulic fluid out of line 35, reducing pressure in the system. Cab alert 146 will not sound, however, due to reverse biased diode 143.

Motor 147 will continue to reduce the pressure in the system until it reaches approximately 7 psi, at which switch 112 will open, coil 132a will de-energize, and contact 132b will open. At this point, motor 147 will shut off. Furthermore, the lack of pressure in line 35 will withdraw the piston in the actuator and reconnect the main braking system. This will equalize the pressure in the vehicle's brakes to 0 psi.

The above-described process will occur each time a bus door is opened and closed. However, for a supplemental parking brake, toggle switch 124 may be placed in override mode, where regardless of the condition of the bus door, coils 133a and 134a will be energized whenever the switch is in "override" position. The operation of this mode is essentially identical to the "arm" mode, where switching to "override" operates like opening the bus door, and where switching to "off" operates like closing the bus door. That is, upon switching toggle switch 124 to "override" mode, the auxiliary system will pressurize the brakes to 800 psi, and will maintain the pressure at 800 psi by energizing the motor whenever the pressure drops below 600 psi. When toggle switch 124 is switched to "off" mode, the control system will reverse the polarity of motor 147, and reduce the pressure in the brakes to 0 psi as described above.

While the invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method of installing a supplemental vehicle brake locking system in an existing closed hydraulic primary vehicle braking control system of the type having a master cylinder for providing hydraulic pressure through braking control lines to control hydraulically actuated brakes on the vehicle, the method comprising the steps of:

(a) installing an actuator in the braking control lines of the vehicle, the actuator installing step including the steps of running a braking control line between a first input of the actuator and a portion of the existing closed hydraulic primary vehicle braking control system that is in fluid communication with the master cylinder and running a braking control line between an output of the actuator and a portion of the existing closed hydraulic primary vehicle braking control system that is in a fluid communication with the hydraulically actuated brakes, wherein the actuator installing step is the only modification to the existing closed hydraulic primary vehicle braking control system, the actuator including:

(i) isolating means for isolating the master cylinder from the brakes when pressure applied to a second input of the actuator exceeds a predetermined pressure; whereby control of the brakes is provided by the existing closed hydraulic primary vehicle braking control system when the pressure applied to the second input of the actuator is below the predetermined pressure; and (ii) auxiliary pressurizing means for pressurizing the brakes responsive to pressure applied to the second input of the actuator when the master cylinder is isolated from the brakes;

(b) installing an auxiliary hydraulic pump in fluid communication with the second input of the actuator; and (c) installing an auxiliary hydraulic pump controller, the controller being configured to selectively activate the auxiliary hydraulic pump to:

(i) fully pressurize the brakes and isolate the master cylinder therefrom; and (ii) fully de-pressurize the brakes and reconnect the master cylinder thereto.

2. The method of claim 1, wherein the controller activates the auxiliary hydraulic pump in response to a predetermined vehicle operating condition.

3. The method of claim 2, further comprising the step of electrically coupling an on/off switch to the controller to sense the predetermined vehicle operating condition.

4. The method of claim 2, further comprising the step of electrically coupling a door interlock switch to the controller to sense the predetermined vehicle operating condition.

5. The method of claim 2, further comprising the step of electrically coupling a dead man switch to the controller to sense the predetermined vehicle operating condition.

6. The method of claim 1, further comprising the step of filling the supplemental vehicle brake locking system with auxiliary hydraulic fluid.

7. The method of claim 6, wherein the controller activates the auxiliary hydraulic pump to pressurize the brakes in a first operating configuration.

8. The method of claim 7, wherein the auxiliary hydraulic fluid pump is reversible, and wherein the controller selectively activates the auxiliary hydraulic fluid pump in reverse in a second operating configuration to de-pressurize the brakes and reconnect the master cylinder thereto.

9. The method of claim 8, further comprising the step of electrically coupling first and second pressure sensors to the controller to sense the pressure of the auxiliary hydraulic fluid, wherein the controller de-activates the auxiliary hydraulic pump in the first operating configuration when the pressure of the auxiliary hydraulic fluid exceeds a first predetermined pressure, and wherein the controller de-activates the auxiliary hydraulic pump in the second operating configuration when the pressure of the auxiliary hydraulic fluid falls below a second predetermined pressure.

10. The method of claim 9, wherein the controller includes an audible alarm activated in the first operating configuration when the pressure of the auxiliary hydraulic fluid is below the first predetermined pressure.

11. The method of claim 10, wherein the controller delays activation of the audible alarm upon initial activation of the auxiliary hydraulic pump.

12. The method of claim 1, wherein the existing closed hydraulic primary vehicle braking control system is of the type having front and rear brakes, wherein the actuator is a first actuator coupled between the master cylinder and braking control lines in fluid communication with the front brakes, and wherein the method further comprises the step of attaching a first input and an output of a second actuator to braking control lines respectively in fluid communication with the master cylinder and the rear brakes.

13. The method of claim 12, wherein the first and second actuators are mounted within the same housing.

14. The method of claim 1, wherein the isolating means and the auxiliary pressurizing means comprise a piston slidably disposed within a cylinder.

15. A method of installing a supplemental vehicle brake locking system in an existing closed hydraulic primary vehicle braking control system of the type having a master cylinder for providing hydraulic pressure through braking control lines to control hydraulically actuated brakes on the vehicle, the method consisting essentially of the steps of:

(a) installing an actuator in the braking control lines of the vehicle, the actuator installing step including the steps of running a braking control line between a first input of the actuator and a portion of the existing closed hydraulic primary vehicle braking control system that is in fluid communication with the master cylinder and running a braking control line between an output of the actuator and a portion of the existing closed hydraulic primary vehicle braking control system that is in a fluid communication with the hydraulically actuated brakes, wherein the actuator installing step is the only modification to the existing closed hydraulic primary vehicle braking control system, the actuator including:

(i) isolating means for isolating the master cylinder from the brakes when pressure applied to a second input of the actuator exceeds a predetermined pressure; whereby control of the brakes is provided by the existing closed hydraulic primary vehicle braking control system when the pressure applied to the second input of the actuator is below the predetermined pressure; and (ii) auxiliary pressurizing means for pressurizing the brakes responsive to pressure applied to the second input of the actuator when the master cylinder is isolated from the brakes;

(b) installing a reversible auxiliary hydraulic pump in fluid communication with the second input of the actuator;

(c) filling the supplemental vehicle brake locking system with auxiliary hydraulic fluid;

(d) bleeding the supplemental vehicle brake locking system and the existing closed hydraulic primary vehicle braking control system;

(e) installing an auxiliary hydraulic pump controller and electrically coupling the controller to the auxiliary hydraulic pump;

(f) installing a discrete switch and electrically coupling the switch to the controller to selectively activate the auxiliary hydraulic pump in a first direction to fully pressurize the brakes and isolate the master cylinder therefrom, and to activate the auxiliary hydraulic pump in a second direction to fully de-pressurize the brakes and reconnect the master cylinder to the brakes; and (g) electrically coupling the controller to a power source on the vehicle.

16. The method of claim 15, wherein the discrete switch is an on/off switch.

17. The method of claim 15, wherein the discrete switch is a door interlock switch.

18. The method of claim 15, wherein the discrete switch is a deadman switch.

19. The method of claim 15, wherein the existing closed hydraulic primary vehicle braking control system is of the type having front and rear brakes, wherein the actuator is a first actuator coupled between the master cylinder and braking control lines in fluid communication with the front brakes, and wherein the actuator installing step further comprises the step of attaching a first input and an output of a second actuator to braking control lines respectively in fluid communication with the master cylinder and the rear brakes.

* * * * *